United States Patent
Chen

(10) Patent No.: US 10,706,780 B2
(45) Date of Patent: Jul. 7, 2020

(54) HEAD-MOUNTED DISPLAY DEVICE AND BRIGHTNESS CONTROL METHOD THEROF

(71) Applicant: Acer Incorporated, New Taipei (TW)

(72) Inventor: Jui-Lin Chen, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 45 days.

(21) Appl. No.: 15/935,368

(22) Filed: Mar. 26, 2018

(65) Prior Publication Data

US 2019/0096328 A1    Mar. 28, 2019

(30) Foreign Application Priority Data

Sep. 28, 2017   (TW) ............................. 106133357 A

(51) Int. Cl.

| G09G 3/36 | (2006.01) |
| G09G 3/3258 | (2016.01) |
| G09G 3/00 | (2006.01) |
| G09G 3/3208 | (2016.01) |
| G06F 3/147 | (2006.01) |

(52) U.S. Cl.
CPC .......... *G09G 3/3258* (2013.01); *G06F 3/147* (2013.01); *G09G 3/003* (2013.01); *G09G 3/3208* (2013.01); *G09G 2320/041* (2013.01); *G09G 2320/0626* (2013.01); *G09G 2320/0673* (2013.01); *G09G 2360/14* (2013.01)

(58) Field of Classification Search
CPC .. H04L 9/32; G06F 21/32; G06F 3/02; G09G 3/34; G09G 3/36; G09G 5/00
See application file for complete search history.

(56) References Cited

U.S. PATENT DOCUMENTS

| 2005/0156837 A1* | 7/2005 | Kasai ................. G09G 3/3275 345/77 |
| 2017/0124959 A1 | 5/2017 | Kim et al. |
| 2018/0082627 A1* | 3/2018 | Deng ................. G09G 3/3208 |

(Continued)

FOREIGN PATENT DOCUMENTS

| CN | 102413343 A | 4/2012 |
| EP | 2 652 543 B1 | 9/2014 |
| WO | 2017/149526 A2 | 9/2017 |

OTHER PUBLICATIONS

Chinese language office action dated Feb. 22, 2017, issued in application No. TW 106133357.

*Primary Examiner* — Pegeman Karimi
(74) *Attorney, Agent, or Firm* — McClure, Qualey & Rodack, LLP

(57) ABSTRACT

The present disclosure provides a head-mounted display device including a first OLED display, a first temperature sensor, and a controller. The first OLED display is configured to display image data. The first temperature sensor is disposed within the head-mounted display device and is configured to sense the first device temperature of the first OLED display. The controller is electrically connected to the first OLED display and the first temperature sensor. The controller outputs the image data and a first display driving voltage to the first OLED display. The controller adjusts the first display driving voltage to control the brightness performance of the first OLED display according to the change of the first device temperature.

14 Claims, 8 Drawing Sheets

(56) References Cited

U.S. PATENT DOCUMENTS

2018/0136725 A1* 5/2018 Hurst .................. G06F 3/011
2018/0375660 A1* 12/2018 Yildiz ................ H04L 9/3228
2019/0094981 A1* 3/2019 Bradski ............... G06F 3/012

* cited by examiner

HEAD-MOUNTED DISPLAY DEVICE AND BRIGHTNESS CONTROL METHOD THEROF

CROSS REFERENCE TO RELATED APPLICATIONS

This application claims priority of Taiwan Patent Application No. 106133357, filed on Sep. 28, 2017, the entirety of which is incorporated by reference herein.

BACKGROUND OF THE INVENTION

Field of the Invention

The present disclosure relates to a display device, and in particular to a head-mounted display device and a brightness control method thereof.

Description of the Related Art

A head-mounted virtual reality (VR) display is a kind of immersion display. Users can receive images directly without any ambient light source. Therefore, slight changes in the gamma value and brightness in the image can be easily detected by the user. At present, Organic Light-Emitting Diode (OLED) displays are commonly used in VR devices. The brightness of the OLED display is controlled by the voltage. A slight change of voltage in the dark gray scale (e.g. the $64^{th}$ gray scale of 256 levels in total) will significantly affect the performance of the gamma value.

However, when using the VR devices, changes in the temperature within the device can affect the brightness performance of the OLED display (i.e., gamma variations). In the absence of a cooling fan, the temperature within the device may rise substantially. As depicted in FIG. 1, a brightness trend diagram of the $64^{th}$ gray scale of the OLED display from room temperature (25° C.) to 50° C. is shown. In FIG. 1, the X-axis is a timeline (unit: second), and the Y-axis is a brightness value (unit: nit). As the temperature rises, the original brightness of about 3.8 nits of the $64^{th}$ gray scale continues to increase to above 4.0 nits. The original brightness of a dark gray scale jumps to a brighter gray scale. This phenomenon occurs in an actual image scene, and as the temperature rises, the dark gray scales may not be smooth and have noise.

BRIEF SUMMARY OF THE INVENTION

A detailed description is given in the following embodiments with reference to the accompanying drawings.

The present disclosure provides a head-mounted display device and a brightness control method thereof that adjusts the brightness performance according to temperature changes.

The present disclosure provides a head-mounted display device, comprising a first OLED display, a first temperature sensor, and a controller. The first OLED display is configured to display image data. The first temperature sensor is disposed within the head-mounted display device and is configured to sense the first device temperature of the first OLED display. The controller is electrically connected to the first OLED display and the first temperature sensor. The controller outputs the image data and a first display driving voltage to the first OLED display. The controller adjusts the first display driving voltage to control the brightness performance of the first OLED display according to the change of the first device temperature.

The present disclosure further provides a brightness control method for a head-mounted display device which comprises a first OLED display, a first temperature sensor, and a controller, the method including: outputting image data to the first OLED display by the controller to display the image data; sensing the first device temperature of the first OLED display by the first temperature sensor; outputting a first display driving voltage to the first OLED display by the controller, and adjusting the first display driving voltage according to the change of the first device temperature to control the brightness performance of the first OLED display.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE INVENTION

Figure 1:
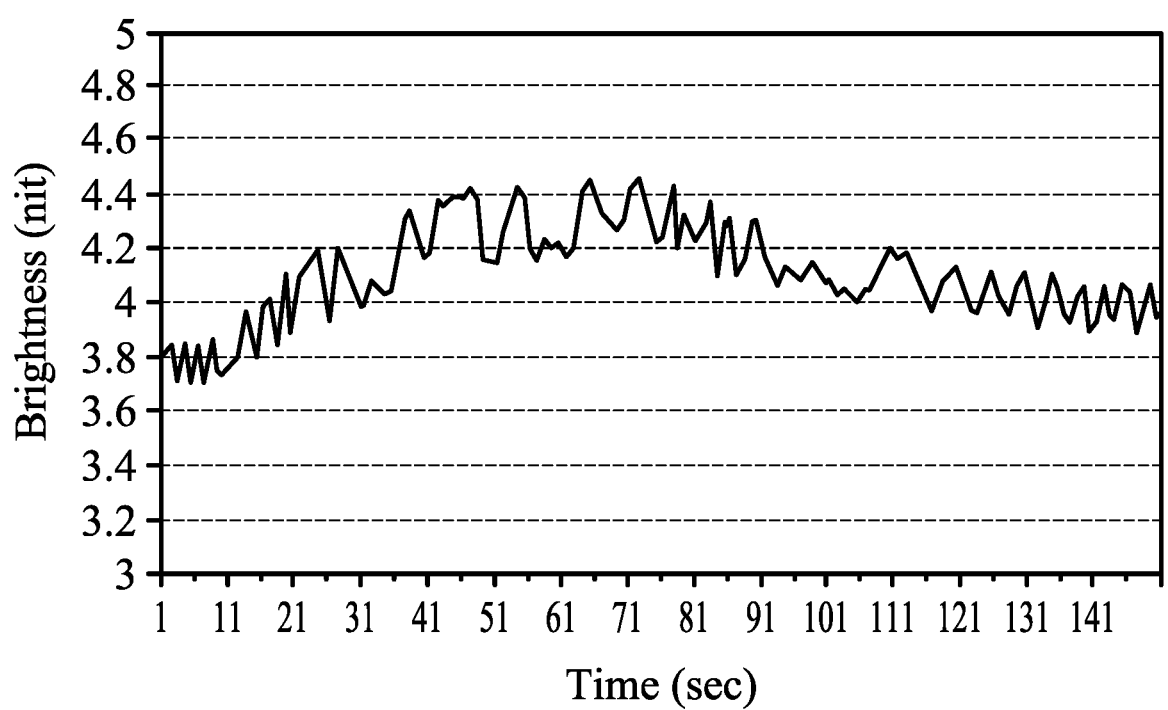
FIG. 1 shows a brightness trend diagram of an OLED display in the $64^{th}$ gray scale.

The following description is of the best-contemplated mode of carrying out the disclosure. This description is made for the purpose of illustrating the general principles of the disclosure and should not be taken in a limiting sense. The scope of the disclosure is best determined by reference to the appended claims.

In addition, features in the drawings are not drawn to scale and are for explanation purposes only. The ordinal numbers in the specification and the claims of the patent application, such as "first", "second", "third" and the like, have no sequential relationship with each other and are merely used to identify different components with the same name.

Figure 2:
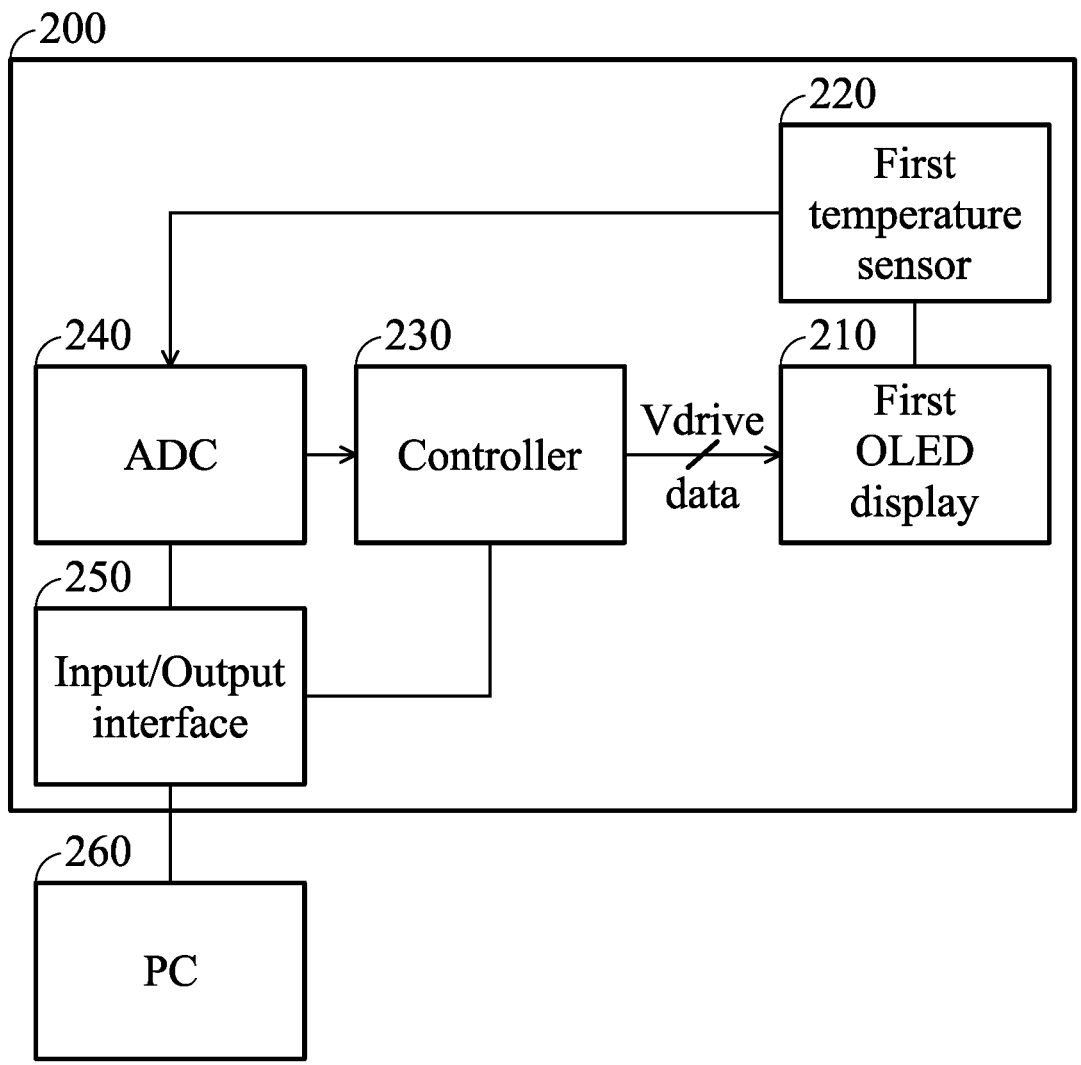
FIG. 2 schematically shows a block diagram of a head-mounted display device according to a first embodiment of the present disclosure.

FIG. 2 schematically shows a block diagram of a head-mounted display device 200 according to a first embodiment of the present disclosure. The head-mounted display device 200 mainly includes a first OLED display 210, a first temperature sensor 220, a controller 230, an Analog to Digital Converter (ADC) 240, and an input/output interface 250.

In this embodiment, the head-mounted display device 200 may provide a virtual reality or an augmented reality function through the controller 230 or through an external PC 260. The controller 230 generates virtual reality or augmented reality images to be displayed by the first OLED display 210 and viewed by the user.

The first OLED display 210 is an Active-Matrix OLED (AMOLED) or a passive-matrix OLED (PMOLED), but it is not limited thereto. The first OLED display 210 further includes an OLED driving circuit and an OLED panel (not shown). The OLED driving circuit receives image data (data) and a first display driving voltage ($V_{drive}$) from the controller 230 and transmits to the OLED panel with a timing control signal for displaying the image data and dynamically adjusting the overall brightness of the OLED panel for users to watch.

The first temperature sensor 220 is an infrared temperature sensor, a thermistor sensor, a thermocouple sensor or the like, but it is not limited thereto. The first temperature sensor 220 is disposed in the head-mounted display device 200 for sensing the first device temperature of the first OLED display 210. The first device temperature is instantly transmitted to the controller 230 through the ADC 240. The first temperature sensor 220 may be disposed directly behind or at any corner of the first OLED display 210 to directly contact the display for sensing the temperature. However, the position of the first temperature sensor 220 is not limited thereto.

The controller 230 is a microcontroller, a microprocessor, a digital signal processor (DSP), or the like, but it is not limited thereto. The controller 230 is electrically connected to the first OLED display 210 and the first temperature sensor 220. The controller 230 outputs image data (data) and a first display driving voltage ($V_{drive}$) to the first OLED display 210. The controller 230 adjusts the first display driving voltage according to the change of the first device temperature, so as to control the brightness performance of the first OLED display 210. The controller 230 may receive the image data from the PC 260. Or the controller 230 may generate the image data with the necessary hardware components (such as a hard disk, a memory, etc.) and transmit to the first OLED display 210 to display the image data. In addition, the first display driving voltage is outputted by the OLED driving circuit portion of the first OLED display to adjust overall brightness of the OLED panel. That is to say, the common driving voltage of each OLED pixel is adjusted in overall.

The ADC 240 receives the first device temperature from the first temperature sensor 220 and the image data from the PC 260. The ADC 240 converts the analog signals of the above data into digital signals and transmits to the controller 230 for subsequent processing. The input/output interface 250 is electrically connected to the ADC 240, the controller 230 and the PC 260 for transmitting information such as image data, brightness and temperature.

The input/output interface 250 may include, but is not limited to, a Display Port (DP), a High Definition Multimedia Interface (HDMI), a Video Graphics Array (VGA) terminal, a Digital Visual Interface (DVI) and any transmission interface that can send image and/or audio-video data. The input/output interface 250 can also be wirelessly connected to the PC 260, such as infrared transmission, Bluetooth or Wi-Fi and the like. The input/output interface 250 may further include an Inter-Integrated Circuit (I²C) for transmitting the brightness and temperature information from the PC 260 and the controller 230.

Besides, the head-mounted display device 200 may further include a case and a strap or other auxiliary device (not shown) for a user to wear on the head. The user views the video or experiences the virtual reality and the augments reality video through the head-mounted display device 200.

As for how the aforementioned controller 230 adjusts the first display driving voltage (Vdrive) according to the change of the first device temperature to control the brightness performance of the first OLED display 210, the details are described as follows. In the general environment of the head-mounted display device without additional fan cooling, the temperature of the device could rise to about 45° C. to 50° C. When the temperature of the OLED rises to 50° C. or drops to 15° C., the gamma value tends to become stabilized. In an embodiment of the present disclosure, the mechanism for the controller to adjust the display driving voltage is shown in Table 1 below. In Table 1, an adjusting mechanism of the display driving voltage is provided for the head-mounted display device 200 when the temperature is at a predetermined temperature (such as room temperature 25° C.), 15° C. and 50° C.

TABLE 1

Adjustment table of driving voltages corresponding to the changes of the temperature

| First device temperature | Voltage (volt) | |
|---|---|---|
| | Hexadecimal | First display driving voltage ($V_{drive}$) |
| 15° C. | 0x50 | 5.2 V |
| ↑ | 0x48 | 4.8 V |
| | 0x40 | 4.4 V |
| | 0x38 | 4.0 V |
| 25° C. | 0x30 | 3.6 V |
| ↓ | 0x28 | 3.2 V |
| | 0x20 | 2.8 V |
| | 0x18 | 2.4 V |
| | 0x10 | 2.0 V |
| | 0x08 | 1.6 V |
| 50° C. | 0x00 | 1.2 V |

For example, the display driving voltages (in hexadecimal) are adjusted in the range from 0x30 to 0x00 in response to the temperature rising from the predetermined temperature by 25° C. to 50° C. In this embodiment, the controller divides the display driving voltage into 48 steps, wherein each step corresponds to a voltage of 0.05V (0.05V/step). According to the following equation (1), when the temperature rises by 1° C., the controller decreases the display driving voltage by 0.096V. In another example, the range of the display driving voltage is from 0x30 to 0x50 which corresponds to a temperature drop of between 25° C. and 15° C. In this embodiment, the controller divides the display driving voltage into 32 steps. According to the following equation (2), when the temperature drops by 1° C., the controller increases the display driving voltage by 0.16V.

$$\frac{48 \text{step}}{25T} \times \frac{0.05V}{\text{step}} = \frac{0.096V}{T} \quad (1)$$

$$\frac{32 \text{step}}{10T} \times \frac{0.05V}{\text{step}} = \frac{0.16V}{T} \quad (2)$$

The following equation (3) can be found by using equation (1) and equation (2), and the controller is based on equation (3).

$$\begin{cases} \text{if } T < 25, V_{drive} = 3.6V + (25 - T) \times \dfrac{0.16V}{T} \\ \quad \text{if } T = 25, V_{drive} = 3.6V \\ \text{if } T > 25, V_{drive} = 3.6V - (T - 25) \times \dfrac{0.096V}{T} \end{cases} \quad (3)$$

Figure 3:
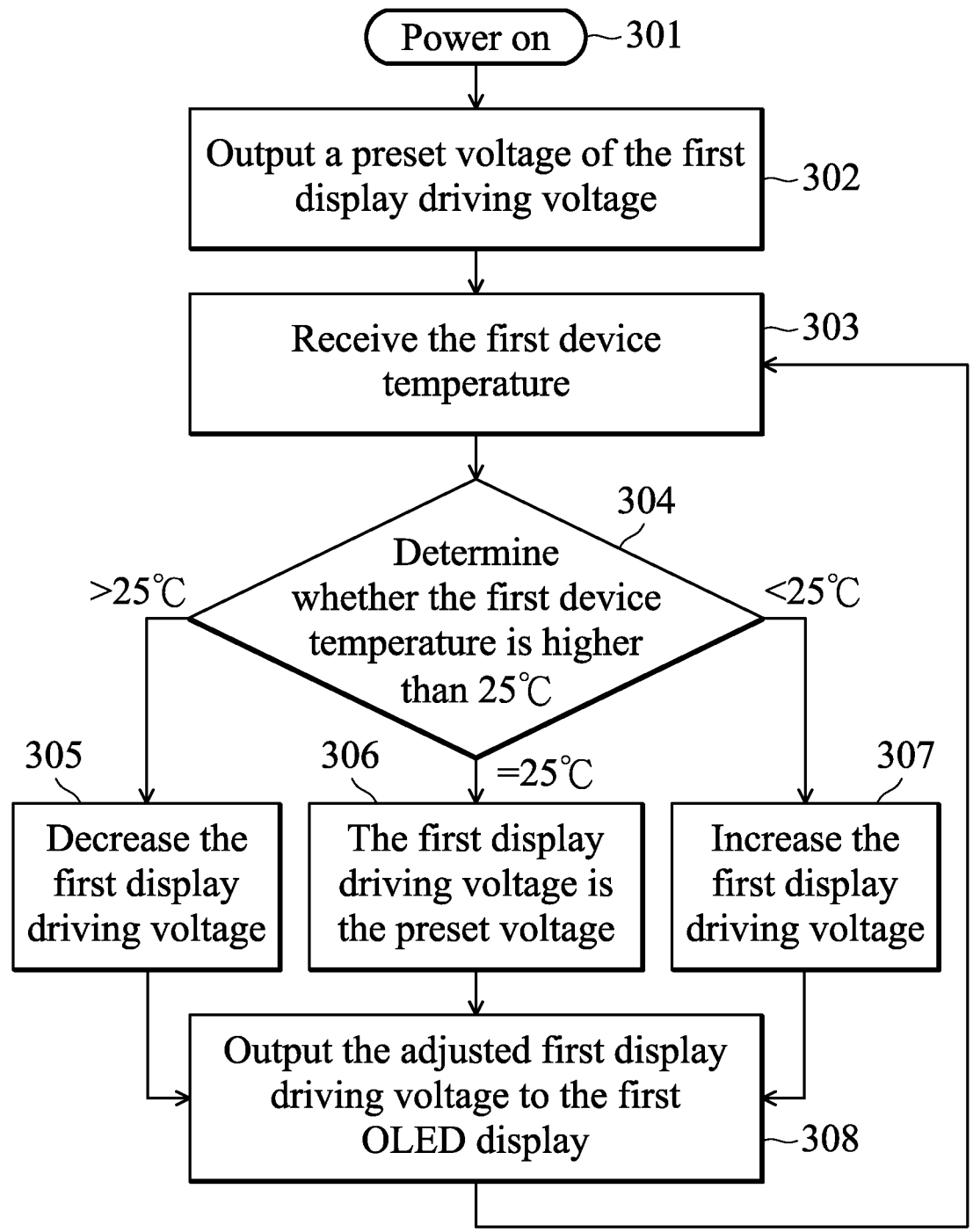
FIG. 3 schematically shows a flow chart of a method for adjusting the display driving voltage.

Next, please refer to FIG. 3, which schematically shows a flow chart of a method for adjusting the display driving voltage. In step 301, the head-mounted display device 200 is powered on for use by the user. In step 302, the controller 230 outputs a preset voltage (e.g., 3.6V) of the first display driving voltage to the first OLED display 210 to control the brightness and display the image data. During use, in step 303, the controller 230 receives the first device temperature sensed by the first temperature sensor 220 of the first OLED display 210. In step 304, the controller 230 determines whether the first device temperature is higher than 25° C. If the first device temperature is higher than 25° C., the method proceeds to step 305, and the controller 230 decreases the first display driving voltage; If the first device temperature is equal to 25° C., the method proceeds to step 306, and the first display driving voltage is the preset voltage (e.g. 3.6V); If the first device temperature is lower than 25° C., the method proceeds to step 307, and the controller 230 increases the first display driving voltage. The above output voltage of the first display driving voltage is obtained from Table 1 or equation (3). Next, in step 308, the controller 230 outputs the adjusted first display driving voltage to the first OLED display, then the method returns to step 303, and the first device temperature is continuously sensed by the first temperature sensor 220.

Figure 4:
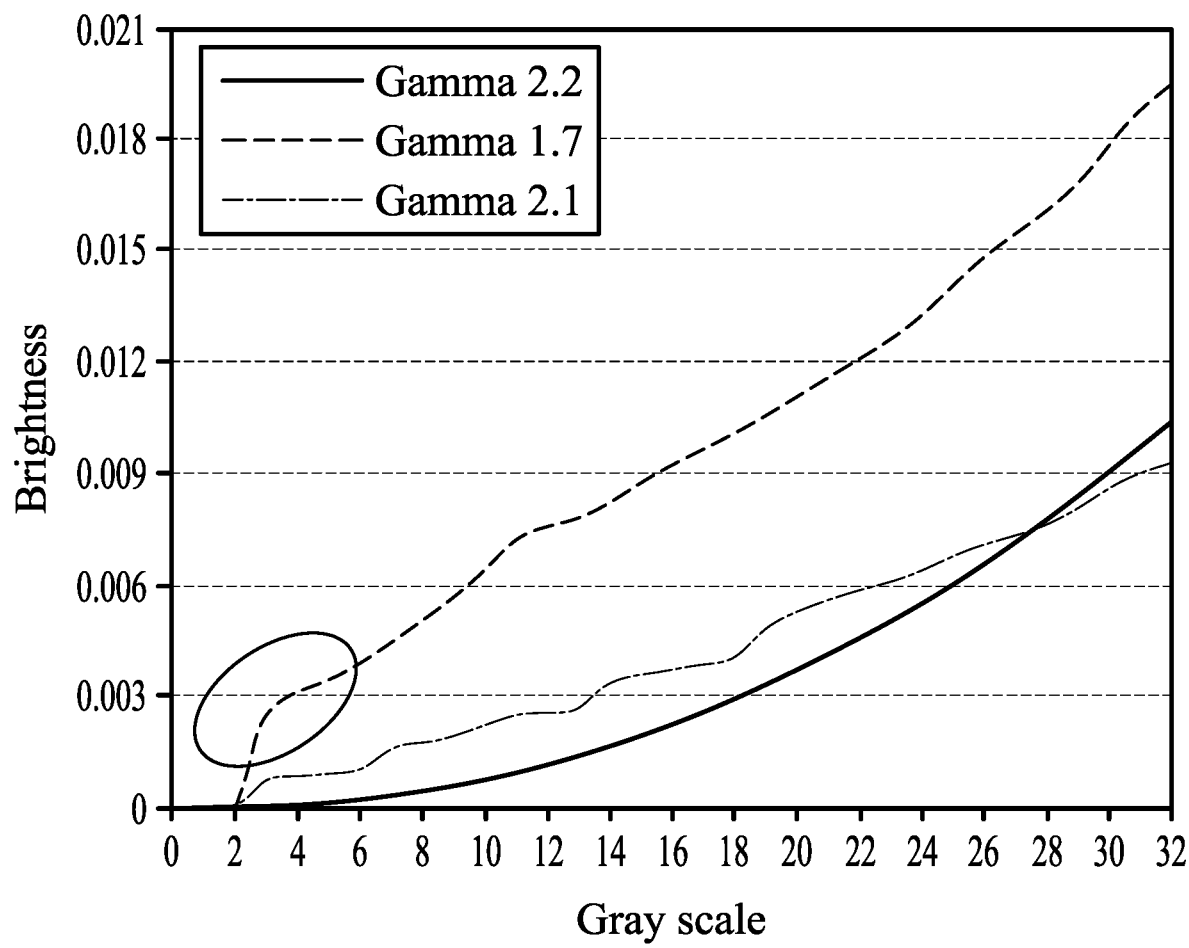
FIG. 4 shows the gamma curve comparison diagram before and after the adjustment of the display driving voltage of the OLED display.

Next, please refer to FIG. 4, which shows the gamma curve comparison diagram before and after the adjustment of the display driving voltage of the OLED display. Because the jumping phenomenon in the dark gray scales of the OLED display is easier to observe, the first 32 gray scales of the gamma curve are evaluated. The gamma curve can also show the smoothness of the distribution of the gray scale. In FIG. 4, the x-axis is the gray scale from 0 to 32, and the y-axis is a normalized brightness value. The solid line in FIG. 4 is the standard gamma curve with a gamma value of 2.2 (Gamma 2.2), while the dotted line is the gamma curve without adjusting the display driving voltage when the temperature of the OLED display rises to 50° C. After fitting the gamma curve of the dotted line, the corresponding gamma value is 1.7 (Gamma 1.7). It should be noted that there is an apparent jumping phenomenon in the dark gray scale ($2^{nd}$ gray scale), marked with a solid circle in the figure. This phenomenon may increase the brightness and cause serious noise in a dark scene (such as $2^{nd}$ gray scale) of the actual image. In addition, the dot-dashed line in FIG. 4 is the gamma curve after adjusting the display driving voltage when the temperature of the OLED display rises to 50° C. After fitting the gamma curve of the dot-dashed line, the corresponding gamma value is about 2.1 (Gamma 2.1) and close to the standard gamma value of 2.2. By adjusting the display driving voltage, the gamma value increases from 1.7 to 2.1. The jumping phenomenon in the dark gray scales of the gamma curve is obviously improved. The method for adjusting the display driving voltage is shown in the flow chart of FIG. 3, and the adjusted voltage is calculated from the equation (3). So that the measured gamma value of the OLED display is at least 2.0 and close to the standard value of 2.2.

Figure 5:
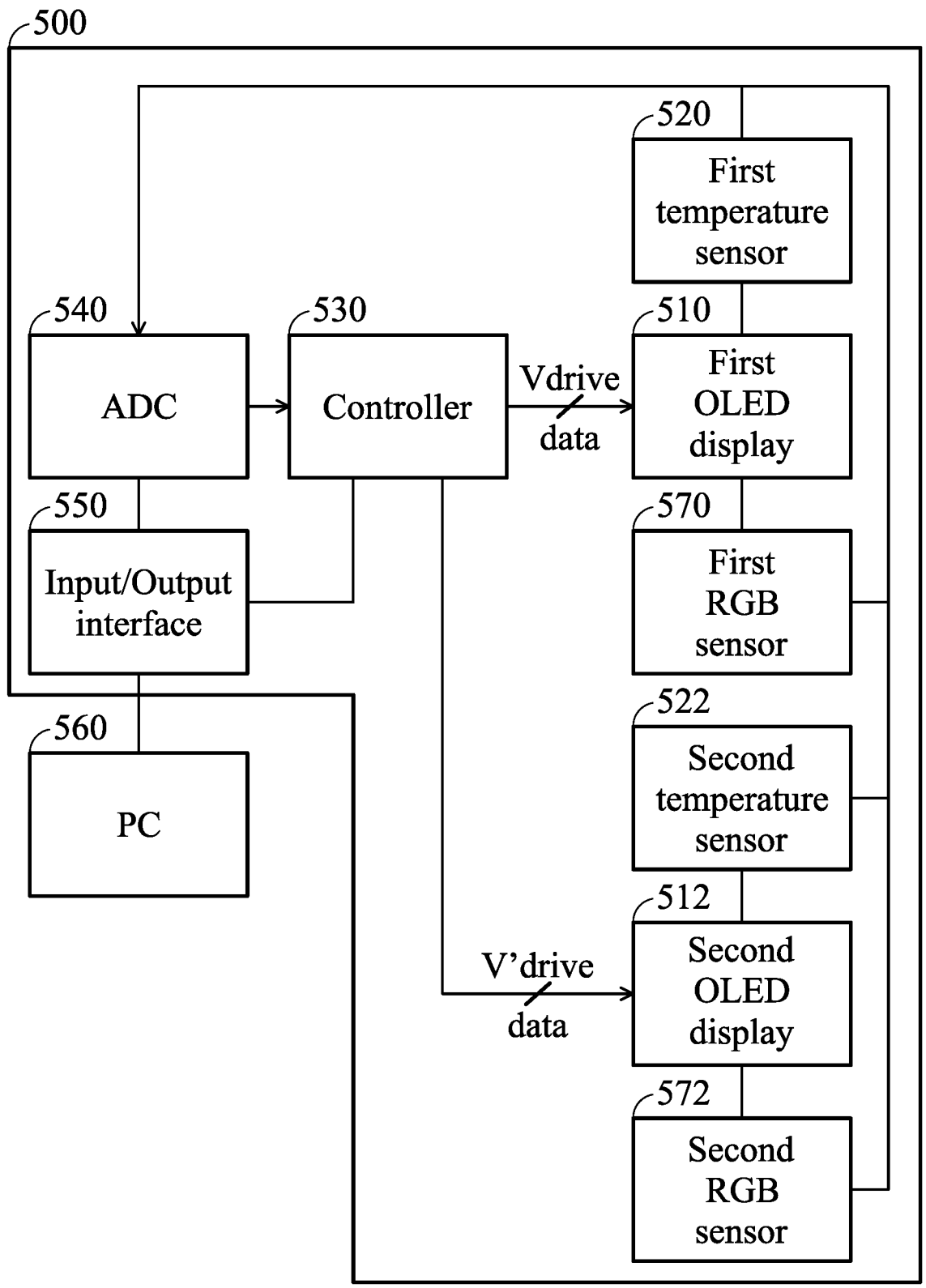
FIG. 5 schematically shows a block diagram of a head-mounted display device according to a second embodiment of the present disclosure.

FIG. 5 schematically shows a block diagram of a head-mounted display device 500 according to a second embodiment of the present disclosure. In this embodiment, the components having the same names as those in the first embodiment of FIG. 2 also have the same functions as those described above, and the details are not described again herein. The main difference between FIG. 5 and FIG. 2 is that the head-mounted display device 500 further includes a second OLED display 512, a second temperature sensor 522, a first RGB sensor 570, and a second RGB sensor 572. In this embodiment, a two-piece OLED display having the first OLED display 510 and the second OLED display 512 is used in the head-mounted display device 500. The two-piece OLED display provides the left-eye and right-eye viewing images respectively to the user and has advantages of a wider viewing angle and less exposure from ambient light.

The second temperature sensor 522 is disposed within the head-mounted display device 500 and is configured to sense the second device temperature of the second OLED display 512. The second temperature sensor 522 may be disposed directly behind or at any corner of the second OLED display 512, but it is not limited thereto. In this embodiment, the first device temperature of the first OLED display 510 and the second device temperature of the second OLED display 512 are sensed by the first temperature sensor 520 and the second temperature sensor 522, respectively, and transmitted to the controller 530 through the ADC 540. The controller 530 is electrically connected to the second OLED display 512 and the second temperature sensor 522. The controller 530 outputs image data and the second display driving voltage ($V'_{drive}$) to the second OLED display 512. The controller 530 adjusts the second display driving voltage ($V'_{drive}$) to control the brightness performance of the second OLED display 512 according to the change of the second device temperature so that the brightness performance of the first and second OLED displays is consistent. The method of adjusting the second display driving voltage according to the change of the second device temperature is shown in the flowchart of FIG. 3, and the details are not described again herein. During the variation of the temperature, the display driving voltages of the first OLED display 510 and the second OLED display 512 are adjusted separately, and the brightness performance of the OLED displays is approximate to the same so that both eyes of the user can view the same image quality. The brightness performance includes image brightness, a contrast and a gamma value.

In this embodiment, the first RGB sensor 570 and the second RGB sensor 572 may be photosensitive devices with different wavelengths, such as photosensitive resistors, charge-coupled devices (CCDs), CMOS sensors or the like, but it is not limited thereto. The first RGB sensor 570 and the second RGB sensor 572 are configured to perform a first gray scale measurement and a second gray scale measurement of the first OLED display 510 and the second OLED display 512, respectively. The controller 530 outputs different gray scales for the gray scale measurements and the gray scales are displayed by the OLED displays. The first RGB sensor 570 and the second RGB sensor 572 sense the brightness information of each gray scale. The controller 530 can also use the RGB sensors for performing gamma correction on the OLED displays.

In another embodiment, the PC 560 may transmit the gray scales and receive the sensed brightness and temperature information to perform the gray scale measurements and the gamma correction through the I$^2$C interface of the input/output interface 550.

In an embodiment of the present disclosure, the gamma correction for the OLED displays described above can be a calibration procedure when the head-mounted display device 500 is initially powered on, but the present disclosure is not limited thereto. The gamma correction includes analyzing the gamma values of the OLED displays and calculating the gamma difference between the OLED displays. The controller adjusts the first display driving voltage and/or the second display driving voltage according to the gamma difference thereby ensuring that the gamma difference is not greater than a predetermined value and ensuring that the gamma values of the OLED displays are both higher than a setting value. In this embodiment, the predetermined value is a gamma value of 0.1 and the setting value is a gamma value of 2.0, but it is not limited thereto. That is to say, in addition to the expectation that the gamma values of the two eyes will be higher than 2.0, the gamma difference between the two eyes is set to be less or equal to 0.1 in order to avoid binocular parallax. As a result, the image quality viewed by the two eyes is the same, and there is no difference in visual. In the gray scale measurement of the gamma correction, the gamma values are analyzed from the gamma curves measured by the OLED displays to calculate the gamma difference between the OLED displays. If the gamma difference is greater than 0.1, then the controller adjusts the initial values of the first display driving voltage and the second display driving voltage respectively. So that the gamma difference is less than or equal to 0.1, and the gamma values of the OLED displays are higher than 2.0.

Figure 6:
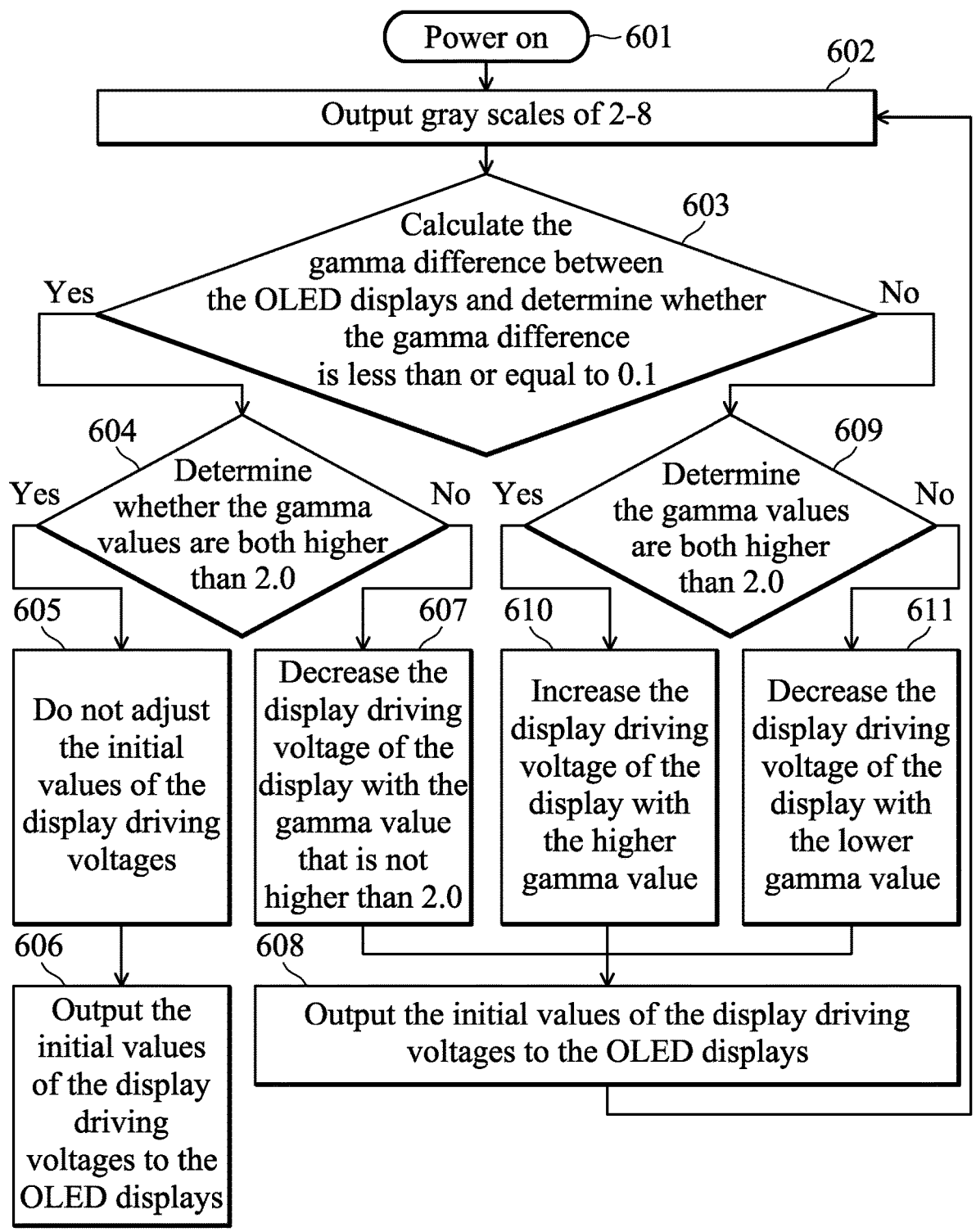
FIG. 6 schematically shows a flow chart of a gamma correction method.

As shown in FIG. 6, FIG. 6 schematically shows a flow chart of a gamma correction method. In step 601, the head-mounted display device 500 is powered on. In step 602, the controller 530 performs a first gray scale measurement and a second gray scale measurement of the first OLED display 510 and the second OLED display 512 respectively, wherein the controller 530 selects a few gray scales for the gray scale measurements to speed up measurement and adjustment. For example, the controller 530 outputs the gray scales of 2-8 in the dark gray scales to perform the gray scale measurements. In step 603, the controller 530 analyzes the gamma values of the first OLED display 510 and the second OLED display 512. The controller 530 calculates the gamma difference between the OLED displays and determines whether the gamma difference is less than or equal to 0.1. If the gamma difference is less than or equal to 0.1, then the method proceeds to step 604, and the controller 530 determines whether the gamma values of the first OLED display 510 and the second OLED display 512 are both higher than 2.0. If the gamma values of the OLED displays are both higher then 2.0, then the method proceeds to step 605, and the controller 530 does not adjust the initial values of the first display driving voltage and the second display driving voltage (for example, the initial value of the voltage is 3.6V). Next, in step 606, the controller 530 outputs the initial value of the first display driving voltage ($V_{drive(initial)}$) and the initial value of the second display driving voltage ($V'_{drive(initial)}$) separately to the OLED displays for providing brightness of a scene.

Returning to step 604, if the gamma values of the OLED displays are not both higher then 2.0, then the method proceeds to step 607, the controller 530 decreases the display driving voltage of the display with the gamma value that is not higher than 2.0. The magnitude of the voltage decrease may be, for example, 0.1 volt each time, but the embodiment of the present disclosure is not limited thereto. Proceeding to step 608, the controller 530 outputs the initial values of the display driving voltage to the OLED displays, and returning to step 602. The controller 530 performs the gray scale measurements to the OLED displays again. The above steps are repeated until the gamma values of the OLED displays are both higher than 2.0.

Returning to step 603, if the gamma difference is greater than 0.1, then the method proceeds to step 609, and the controller 530 determines the gamma values of the OLED displays are both higher than 2.0. If the gamma values are both higher than 2.0, then the method proceeds to step 610, and the controller 530 increases the display driving voltage of the display with the higher gamma value. The magnitude of increasing the voltage may be 0.1 volt each time, but the embodiment of the present disclosure is not limited thereto. Then the method proceeds to step 608. Returning to step 609, if the gamma values are not both higher than 2.0, then the method proceeds to step 611, and the controller 530 decreases the display driving voltage of the display with the lower gamma value. The magnitude of the voltage decrease may be the same as in step 607. Then the method proceeds to step 608, the controller 530 outputs the initial values of the display driving voltage to the OLED displays, and returning to step 602. The above steps are repeated until the gamma difference is less than or equal to 0.1; meanwhile, the gamma values of the OLED displays are both higher than 2.0. Finally, the method ends in step 606, and the gamma correction is complete.

After the gamma correction, the controller 503 outputs the initial value of the first display driving voltage ($V_{drive(initial)}$) and the initial value of the second display driving voltage ($V'_{drive(initial)}$) to the first OLED display 510 and the second OLED display 512, respectively. Based on the initial values of the display driving voltage, the controller 503 sets the initial voltages as the preset voltage of the first display driving voltage and the second display driving voltage. Next, the controller 503 adjusts the first display driving voltage and the second display driving voltage dynamically according to the change of the first device temperature and the second device temperature. The controller 503 controls the brightness performance of the first OLED display 510 and the second OLED display 512 so that the brightness performance of the first and second OLED displays is consistent. Details of the method whereby the controller 503 controls the display driving voltage according to the device temperature can be obtained by referring to the flowchart of the method shown in FIG. 3, and the details are not described again herein.

Figure 7:
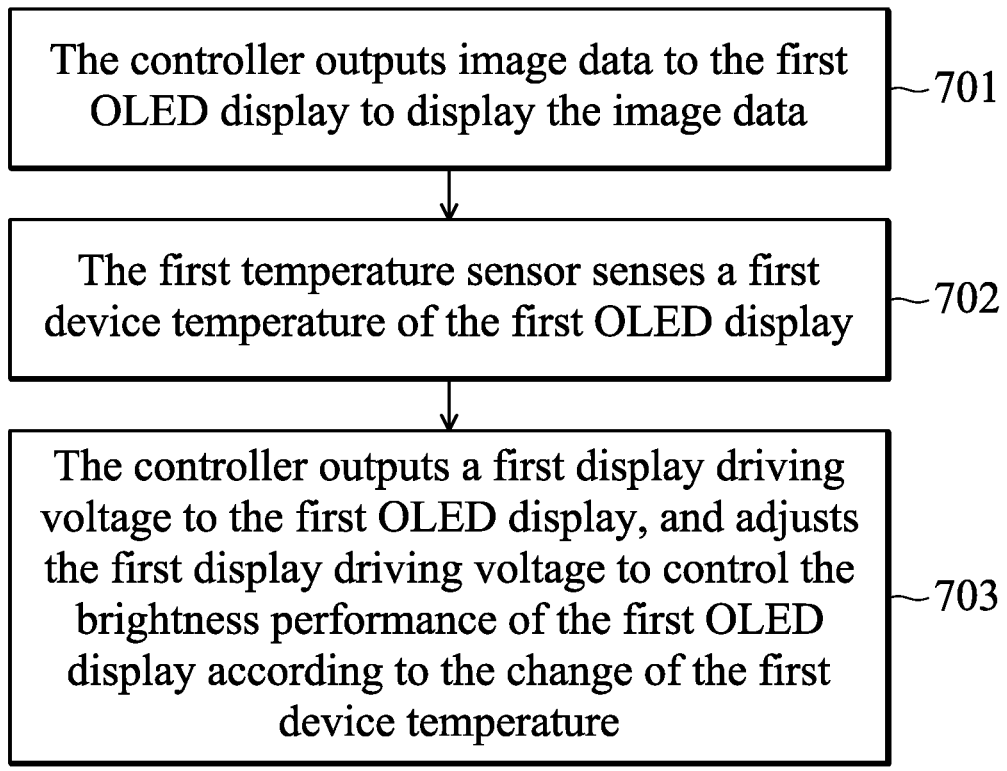
FIG. 7 schematically shows a flow chart of a brightness control method according to the first embodiment of the present disclosure.

Next, please refer to FIG. 7, which schematically shows a flow chart of a brightness control method according to the first embodiment of the present disclosure. The brightness control method is for a head-mounted display device which comprises a first OLED display 210, a first temperature sensor 220, and a controller 230. With reference to FIG. 2 of the first embodiment of the present disclosure, in step 701, the controller 230 outputs image data to the first OLED display 210 to display the image data. In step 702, the first temperature sensor 220 senses the first device temperature of the first OLED display 210. In step 703, the controller 230 outputs a first display driving voltage to the first OLED display 210, and adjusts the first display driving voltage to control the brightness performance of the first OLED display 210 according to the change of the first device temperature. In addition, after step 703 is completed, the method may return to step 702, and the first temperature sensor 220 continuously senses the first device temperature.

Besides, in step 703, wherein the controller controls the brightness performance of the first OLED display so that the measured gamma value of the first OLED display 210 is at least 2.0 and close to the standard value of 2.2. It should be noted that, in step 703, when the controller 230 determines that the first device temperature is equal to a predetermined temperature (e.g., room temperature 25° C.), the first display driving voltage is a preset voltage (e.g. 3.6V); when the first device temperature is higher than the predetermined temperature, the controller 230 decreases the first display driving voltage; when the first device temperature is lower than the predetermined temperature, the controller 230 increases the first display driving voltage. Furthermore, in step 701, the head-mounted display device 200 provides a virtual reality or an augmented reality function, and the controller 230 generates virtual reality or augmented reality images, and the images are displayed by the first OLED display 210.

Figure 8:
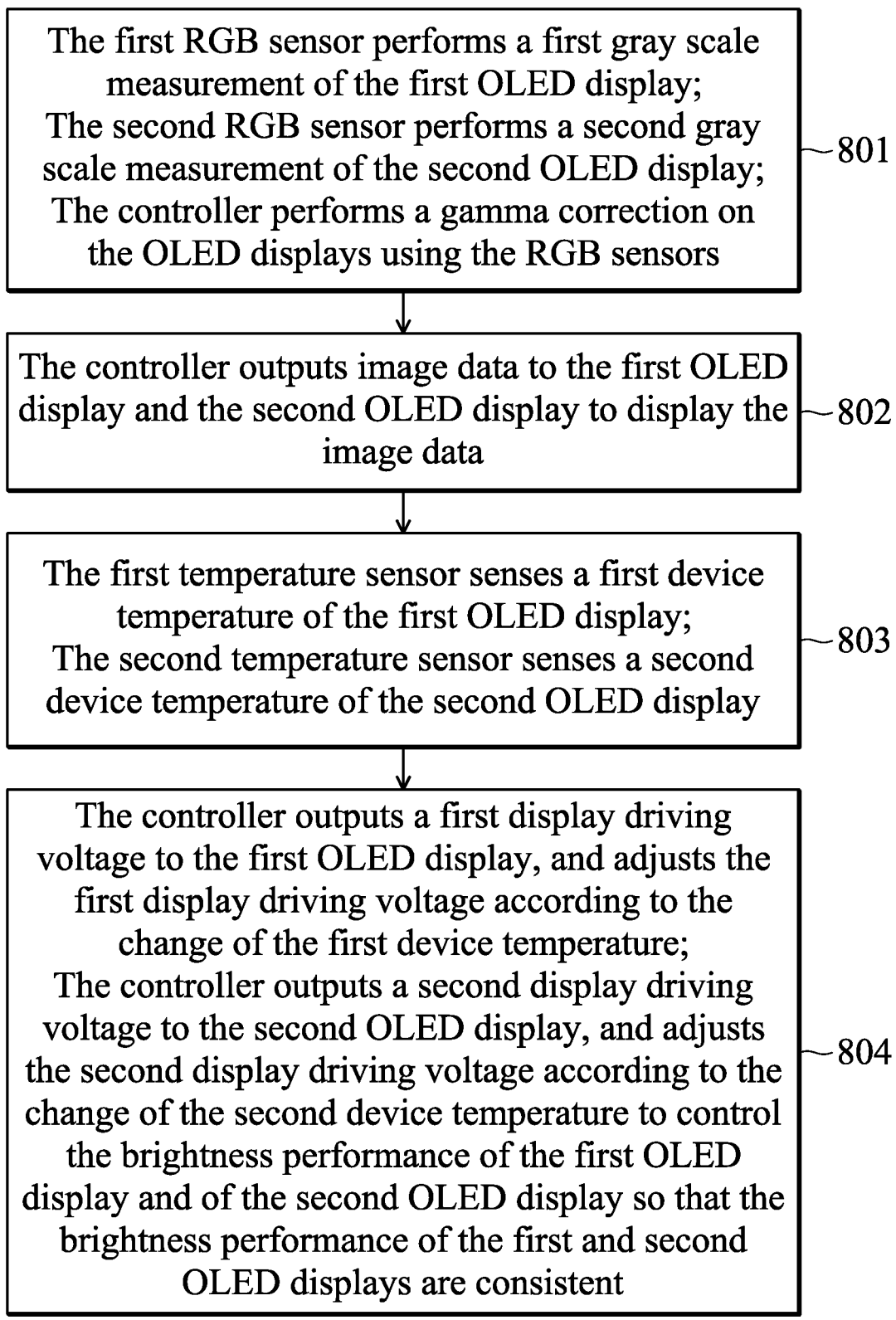
FIG. 8 schematically shows a flow chart of a brightness control method according to the second embodiment of the present disclosure.

FIG. 8 schematically shows a flow chart of a brightness control method according to the second embodiment of the present disclosure. The brightness control method is for a head-mounted display device 500 which comprises a first OLED display 510, a second OLED display 512, a first temperature sensor 520, a second temperature sensor 522, a first RGB sensor 570, a second RGB sensor 572, and a controller 530. In the flow chart of this method, the steps are the same as those shown in the flow chart of the method of the first embodiment described above in FIG. 7, and the details are not described again herein. With reference to FIG. 5 of the second embodiment of the present disclosure, in step 801, the first RGB sensor 570 performs a first gray scale measurement of the first OLED display 510; the second RGB sensor 572 performs a second gray scale measurement of the second OLED display 512; the controller 530 performs a gamma correction on the OLED displays using the RGB sensors. After the gamma correction is complete, the method proceeds to step 802. The controller 503 outputs image data to the first OLED display 510 and the second OLED display 512 to display the image data. In step 803, the first temperature sensor 520 senses the first device temperature of the first OLED display 510; the second temperature sensor 522 senses the second device temperature of the second OLED display 512. In step 804, the controller 530 outputs a first display driving voltage to the first OLED display 510 and adjusts the first display driving voltage according to the change of the first device temperature; the controller 530 outputs the second display driving voltage to the second OLED display 512, and adjusts the second display driving voltage according to the change of the second device temperature to control the brightness performance of the first OLED display 510 and of the second OLED display 512 so that the brightness performance of the first and second OLED displays is consistent.

In addition, in step 801, the gamma correction includes analyzing the gamma values of the OLED displays and calculating the gamma difference between the OLED displays. If the gamma difference is greater than 0.1, then the controller 530 adjusts the initial values of the first display driving voltage and the second display driving voltage separately. So that the gamma difference is less than or equal to 0.1, and the gamma values of the OLED displays are higher than 2.0. In step 801, the controller selects a few gray scales for the gray scale measurements when performing the gamma correction to speed up measurement and adjustment. It should be noted that the gamma correction in step 801 is not limited to being completed before step 802. Step 801 may be performed after the controller 530 receives a gamma correction instruction, and the present disclosure is not limited thereto.

Therefore, according to the head-mounted display device and the brightness control method thereof, the temperature sensor is used to track the temperature change of the OLED display, and the controller simultaneously adjusts the display driving voltages of the two OLED displays at a different temperature so that the brightness performance is adjusted instantly. As a result, the jumping phenomenon in the dark gray scales is resolved, and the image quality decay issue as the temperature changes of a head-mounted OLED display is improved. Also, the image quality is the same for both of the user's eyes. The user's experience of the virtual reality using the head-mounted display device is better.

While the disclosure has been described by way of example and in terms of the preferred embodiments, it is to be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A head-mounted display device, comprising:
   a first OLED display, configured to display image data;
   a first temperature sensor, disposed within the head-mounted display device, and configured to sense a first device temperature of the first OLED display; and
   a controller, electrically connected to the first OLED display and the first temperature sensor, outputting the image data and a first display driving voltage to the first OLED display, and adjusting the first display driving voltage according to the change of the first device temperature to control a brightness performance of the first OLED display;
   wherein when the first device temperature is equal to a predetermined temperature, the first display driving voltage is a preset voltage; when the first device temperature is higher than the predetermined temperature, the controller decreases the first display driving voltage; and when the first device temperature is lower than the predetermined temperature, the controller increases the first display driving voltage.

2. The head-mounted display device as claimed in claim 1, further comprising:
   a second OLED display, configured to display the image data;
   a second temperature sensor disposed within the head-mounted display device, and configured to sense a second device temperature of the second OLED display;
   the controller, electrically connected to the second OLED display and the second temperature sensor, outputting the image data and a second display driving voltage to the second OLED display, and adjusting the second display driving voltage according to the change of the second device temperature to control the brightness performance of the second OLED display so that the brightness performance of the first and second OLED displays is consistent.

3. The head-mounted display device as claimed in claim 2, further comprising:
   a first RGB sensor, configured to perform a first gray scale measurement of the first OLED display;
   a second RGB sensor, configured to perform a second gray scale measurement of the second OLED display;
   the controller, performing a gamma correction on the first and second OLED displays using the RGB sensors.

4. The head-mounted display device as claimed in claim 3, wherein the gamma correction includes analyzing gamma values of the OLED displays and calculating a gamma difference between the OLED displays;

the controller adjusts the first display driving voltage and/or the second display driving voltage according to the gamma difference thereby ensuring that the gamma difference is not greater than a predetermined value and ensuring that the gamma values of the OLED displays are both higher than a setting value.

5. The head-mounted display device as claimed in claim 3, wherein the controller selects a few gray scales for the gray scale measurements when performing the gamma correction to speed up measurement and adjustment.

6. The head-mounted display device as claimed in claim 1, wherein the controller controls the brightness performance of the first OLED display so that the measured gamma value of the first OLED display is at least 2.0 and close to the standard value of 2.2.

7. The head-mounted display device as claimed in claim 1, wherein the head-mounted display device provides a virtual reality or an augmented reality function; and the controller generates virtual reality or augmented reality images to be displayed by the first OLED display.

8. A brightness control method for a head-mounted display device which comprises a first OLED display, a first temperature sensor and a controller, the method comprising:
outputting image data to the first OLED display by the controller to display the image data;
sensing the first device temperature of the first OLED display by the first temperature sensor;
outputting a first display driving voltage to the first OLED display by the controller, and adjusting the first display driving voltage according to the change of the first device temperature to control the brightness performance of the first OLED display;
wherein the head-mounted display device further comprises a second OLED display and a second temperature sensor, the method further comprising:
outputting the image data to the second OLED display by the controller to display the image data;
sensing the second device temperature of the second OLED display by the second temperature sensor;
outputting the second display driving voltage to the second OLED display by the controller, and adjusting the second display driving voltage according to the change of the second device temperature to control the brightness performance of the second OLED display so that the brightness performance of the first and second OLED displays is consistent.

9. The method as claimed in claim 8, wherein the head-mounted display device further comprises a first RGB sensor and a second RGB sensor, the method further comprising:
performing a first gray scale measurement of the first OLED display by the first RGB sensor;
performing a second gray scale measurement of the second OLED display by the second RGB sensor;
performing a gamma correction on the OLED displays by the controller using the RGB sensors.

10. The method as claimed in claim 9, wherein the gamma correction includes analyzing gamma values of the OLED displays and calculating a gamma difference between the OLED displays;
the controller adjusts the first display driving voltage and/or the second display driving voltage according to the gamma difference thereby ensuring that the gamma difference is not greater than a predetermined value and ensuring that the gamma values of the OLED displays are both higher than a setting value.

11. The method as claimed in claim 9, wherein the controller selects a few gray scales for the gray scale measurements when performing the gamma correction to speed up measurement and adjustment.

12. The method as claimed in claim 8, wherein the controller controls the brightness performance of the first OLED display so that the measured gamma value of the first OLED display is at least 2.0 and close to the standard value of 2.2.

13. The method as claimed in claim 8, wherein when the first device temperature is equal to a predetermined temperature, the first display driving voltage is a preset voltage; when the first device temperature is higher than the predetermined temperature, the controller decreases the first display driving voltage; and when the first device temperature is lower than the predetermined temperature, the controller increases the first display driving voltage.

14. The method as claimed in claim 8, further comprising:
providing a virtual reality or an augmented reality function by the head-mounted display device;
generating virtual reality or augmented reality images by the controller and displaying the virtual reality or augmented reality images by the first OLED display.

* * * * *